US009106553B2

(12) United States Patent
Wong et al.

(10) Patent No.: US 9,106,553 B2
(45) Date of Patent: Aug. 11, 2015

(54) SYSTEM AND METHOD FOR SHARING RESOURCES AND INTERFACES AMONGST CONNECTED COMPUTING DEVICES

(75) Inventors: Yoon Kean Wong, Redwood City, CA (US); Karl Townsend, Los Altos, CA (US); Paul Chambers, San Jose, CA (US); Ramachandran Venkataraman, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1948 days.

(21) Appl. No.: 11/691,484

(22) Filed: Mar. 26, 2007

(65) Prior Publication Data

US 2008/0244050 A1    Oct. 2, 2008

(51) Int. Cl.
*G06F 3/00* (2006.01)
*G06F 13/00* (2006.01)
*H04L 12/24* (2006.01)

(52) U.S. Cl.
CPC ............ *H04L 41/12* (2013.01); *H04L 41/0809* (2013.01)

(58) Field of Classification Search
None
See application file for complete search history.

(56) References Cited

U.S. PATENT DOCUMENTS

| | | | |
|---|---|---|---|
| 6,631,520 B1 * | 10/2003 | Theron et al. | 717/173 |
| 7,734,841 B2 * | 6/2010 | Townsend | 710/16 |
| 2002/0007490 A1 * | 1/2002 | Jeffery | 725/78 |
| 2004/0128353 A1 * | 7/2004 | Goodman et al. | 709/204 |
| 2004/0233930 A1 * | 11/2004 | Colby, Jr. | 370/464 |
| 2005/0076092 A1 * | 4/2005 | Chang et al. | 709/217 |
| 2005/0138179 A1 * | 6/2005 | Encarnacion et al. | 709/227 |
| 2006/0007126 A1 * | 1/2006 | Shih | 345/156 |
| 2006/0165110 A1 * | 7/2006 | Magendanz et al. | 370/419 |
| 2006/0198356 A1 * | 9/2006 | Mayernick | 370/351 |
| 2007/0057063 A1 * | 3/2007 | Zhu et al. | 235/462.15 |
| 2008/0052384 A1 * | 2/2008 | Marl et al. | 709/223 |
| 2008/0162957 A1 * | 7/2008 | Lassa et al. | 713/310 |
| 2009/0103535 A1 * | 4/2009 | McCoy et al. | 370/392 |
| 2010/0131691 A1 * | 5/2010 | Chatterjee et al. | 710/303 |

\* cited by examiner

*Primary Examiner* — Michael Sun
(74) *Attorney, Agent, or Firm* — Mahamedi Paradice LLP

(57) ABSTRACT

A computing device is provided that includes a plurality of user-interactive mechanisms. The computing device may also include a universal communication port that is capable of receiving a connection from a device that belongs to any one of a plurality of device classes or types. The device may be equipped or configured with logic. The logic may configure or otherwise enable an operative state of user-interface mechanisms on the device. Additionally, the logic may (i) detect a connected device that connects to the universal communication port, and (ii) determine a set of functionality that the connected device is capable of performing when connected to the universal communication port. The logic may perform, or cause performance, of operations that are for use with or by the connected device. The logic may also perform at least one of (i) selectively route data to the connected device over the universal communication port, or (ii) selectively disable one or more of the plurality of user-interactive mechanisms while performing the operations.

25 Claims, 4 Drawing Sheets

SYSTEM AND METHOD FOR SHARING RESOURCES AND INTERFACES AMONGST CONNECTED COMPUTING DEVICES

TECHNICAL FIELD

The disclosed embodiments relate generally to the field of information and communication exchange amongst computing devices. In particular, the disclosed embodiments relate to a system and method for sharing resources and interfaces amongst connected computing devices.

BACKGROUND

Small computing devices have greater computing power and resources than before. These devices have increasing capability to perform advanced functions, as well as communicate with other devices or computers. For example, numerous small form-factor devices exist that can playback video, and communicate video out through cables to monitors and large displays.

DETAILED DESCRIPTION

Figure 1:
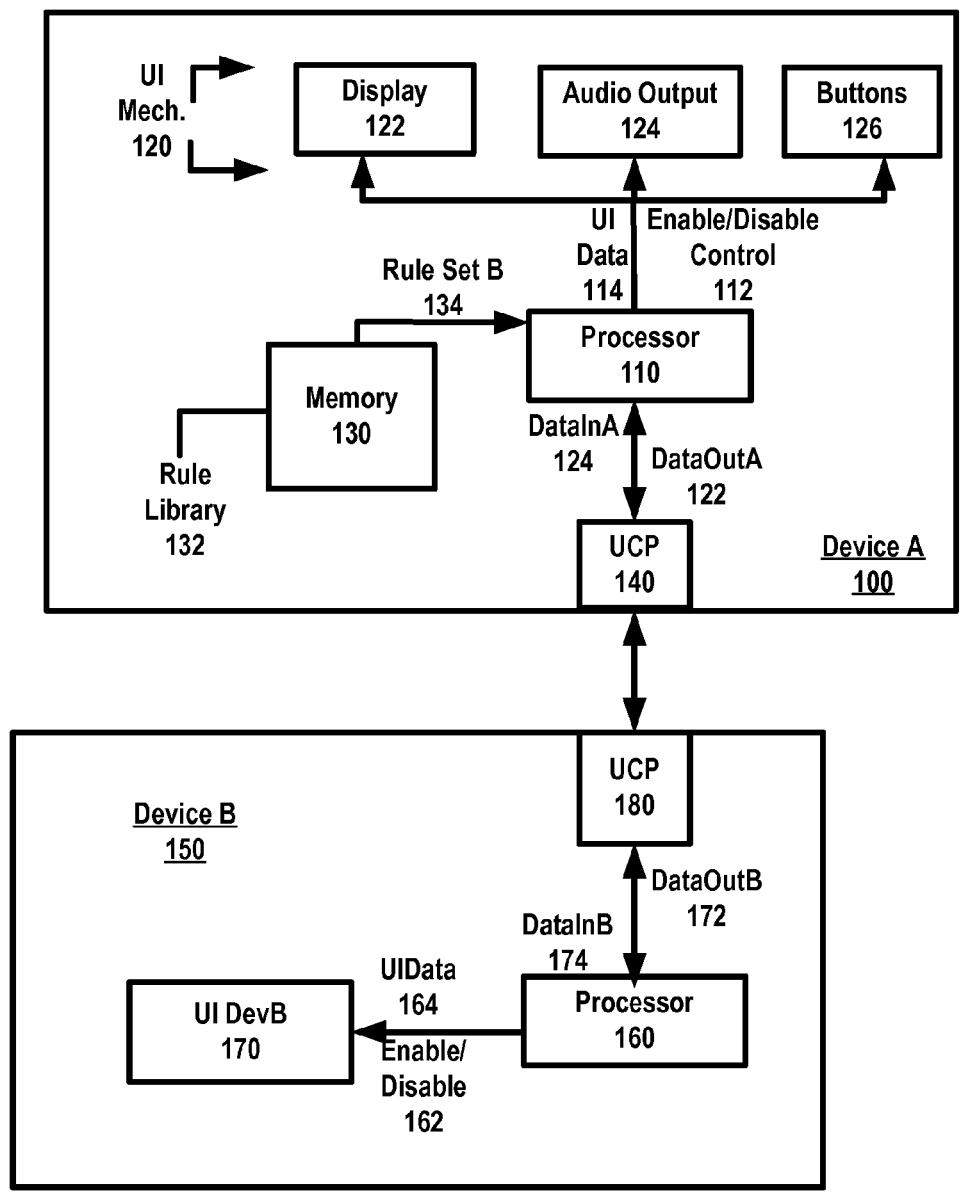
FIG. 1 illustrates a computing device coupled to communicate with another device, in a manner that enables the computing device to allocate user-interface features and/or other resources between the two devices, under an embodiment of the invention.

Embodiments described herein provide for a computing device that is enabled to detect a connected computing device, and to perform operations that distribute resources and/or user-interface mechanisms. In an embodiment, the computing device is configured so that when it is combined with another device, the two devices provide a combined functionality.

In an embodiment, a computing device is provided that includes a plurality of user-interactive mechanisms. The computing device may also include a universal communication port that is capable of receiving a connection from a device that belongs to any one of a plurality of device classes or types. The device may be equipped or configured with logic. The logic may configure or otherwise enable an operative state of user-interface mechanisms on the device. Additionally, the logic may (i) detect a connected device that connects to the universal communication port, and (ii) determine a set of functionality that the connected device is capable of performing when connected to the universal communication port. The logic may perform, or cause performance, of operations that are for use with or by the connected device. The logic may also perform at least one of (i) selectively route data to the connected device over the universal communication port, or (ii) selectively disable one or more of the plurality of user-interactive mechanisms while performing the operations.

As used herein, the term "logic" means a combination of processing and memory configured to perform operations, functions, including the performance of application or system level software routines or processes. Hardware logic is made up of circuits that perform an operation. Software logic is the sequence of instructions in a program.

Unless stated otherwise, all reference made to the USB Standard should be assumed to mean the USB 2.0 standard and/or one of its Supplements. Any reference made to the USB 2.0 standard refers to the Specification adopted by the USB Implementation Forum in 2001, and released in April 2000. For purpose of defining various aspects of the USB standard (not just USB 2.0), the USB 2.0 Standard, as released in April 2000 and revised in December 2002 is hereby incorporated by reference. Moreover, the USB On-The-Go Supplement 1.2, as released in April 2006, is also incorporated by reference. While numerous embodiments make reference or incorporate aspects of the USB standard, other embodiments may extend to devices and connectivity systems that are not part of the USB standard, such as devices that incorporate non-standard proprietary connectors.

Numerous types of computing devices may be used with embodiments described herein. One type of computing device that may be employed with one or more embodiments include mobile or portable computing devices, including wireless devices for use in messaging and telephony applications using cellular networks. Such devices are sometimes called "smart phones", "hybrid devices" or "multi-function devices" or "handheld devices". Mobile computing devices are generally small enough to fit in one hand, but provide cellular telephony features in combination with other applications. Examples of such other applications include contact applications for managing contact records, calendar applications for managing and scheduling events, task applications for keeping lists, and camera applications for capturing images. Additionally, many types of messaging transports may be provided on such mobile computing devices, including SMS, MMS, email and instant messaging.

Other examples of mobile computing devices contemplated for use with one or more embodiments described herein include portable media players, global positioning system devices, personal digital assistants, portable gaming machines, and/or devices that combine functionality of such devices. In addition, at least some embodiments described herein are applicable to desktop computers, laptops, and computer appliances (e.g. set-top boxes). A typical environment on which one or more embodiments may be implemented include a wireless or cellular device capable of both telephony and messaging or data transfer.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

System Description

FIG. 1 illustrates a computing device coupled to communicate with another device, in a manner that enables the computing device to configure or allocate user-interface features and/or other resources between the two devices, under an embodiment of the invention. In an embodiment shown, a computing device ("Device A") 100 is capable of connecting and communicating with another connected device ("Device B") 150. Computing device 100 may include a processor 110, a set of user-interface mechanisms 120, a memory 130, and a universal communication port 140. Likewise, the connected device 150 may include a processor 160, a set of user interface mechanisms 170, and a corresponding universal communication port 180. The devices 100, 150 may communicate with one another using the universal communication ports 140, 180.

While both devices may contain processing and memory and perform high level functions (e.g. such as execute an operating system or perform applications), an embodiment of FIG. 1 assumes that the computing device 100 has the role of a host or controller, while the device 150 is an accessory device. In one implementation, device 100 corresponds to a mobile computing device, such as one that is capable of cellular telephony, messaging and data communications. The device 100 may include an operating system (e.g. PALM OS manufactured by PALM INC.) and be used to execute any one of many possible applications. Other examples of functions that may be performed by device 100 include image or video capture and media playback. In one embodiment, computing device 150 may have a primary or dedicated function which is accessorial or ancillary to the operations of the device 100. For example, the device 150 may correspond to a Global Positioning System (GPS) device, capable of receiving GPS communications. However, embodiments such as described herein may have applicability to other implementation scenarios. For example, either or both of devices 100, 150 may correspond to a laptop computer, media playback or output device, or ultra-small and fully functional computer.

The universal communication ports 140, 180 may be of a type that enables one or both devices to connect with any one of a plurality of devices of different classes or types, depending on the type or capability of the respective device 100, 150. Device classes are defined to mean devices that have a same general primary function or output. For example, Liquid Crystal Display devices may be of a display class, while multi-functional devices (ultra-small notebooks) or of another device class. A cable (not shown) may interconnect the two devices 100, 150. As such, device 100 may be capable of connecting and using numerous kinds of computers and accessory devices across the universal communication port 140. For example, the universal communication port 140 may connect, either directly or through use of a cable, with other computers (e.g. laptops), flash memory devices, and keyboards. As used herein, the universal communication port 140 is non-proprietary communication port that uses mechanical, wireless or logical connectors for enabling connectivity by a diverse range of devices and device classes. For example, the universal communication port 140 may be structured or configured to be in accordance with specifications and requirements of a standard's body. One example of a standard's body is the Universal Serial Bus standard, as described below. Other embodiments contemplate use of versatile or diverse communication ports, whether proprietary or not, that are capable connecting (physically, wirelessly or logically) with a diverse range of device classes.

In one embodiment, device 100 is capable of acting as a host when it is connected to another device across the universal communication port 140. For example, the universal communication ports 140, 180 may correspond to Universal Serial Bus type receptacle connectors, and the universal communication port of the computing device 100 may be either a Type A or Type A/B receptacle. As such, the universal communication port 140 (or of either device) may include a Micro or Mini USB connector, along with other hardware and/ logic (e.g. physical interface). However, other types of communication ports are also contemplated. For example, the universal communication ports 140, 180 may correspond to Firewire type communication ports. Still further, the universal communication ports 140, 180 may correspond wireless or ports (e.g. wireless USB) or logical ports (e.g. Ethernet, virtual communication protocol interface).

On device 100, user-interface mechanisms 120 may include display 122, audio output device 124, and buttons 126. In one implementation, display 122 is contact-sensitive. Buttons 126 represent only one kind of mechanical actuation mechanisms. Other examples of actuation mechanisms include multi-directional input mechanisms such as 5-way interfaces, touch pads, joy sticks, toggle switches, or a jog dial. On device 150, more, fewer or different user-interface mechanism may be provided, depending on the implementation. In, for example, an embodiment of a GPS accessory (such as described with an embodiment of FIG. 4), the device 150 may include output speakers and a smaller set of buttons.

The memory 130 on device 100 may store a rule library 132 for enabling the processor 110 to perform operations and functions for sharing or allocating user-interface mechanisms and other resources. In an embodiment, the device 100 detects another connecting device such as device 150, determines the capabilities and/or resources of the device 150, and then uses a rule set 134 from the rule library 132 to select data ("data out 122") that is to be communicated to the device 150. The Data Out 122 may be received on the computing device 150 as Data In 174. Accordingly, the Data Out 122 may be communicated to the connected device 150 for use by the user-interface mechanisms 170 of that device.

Concurrently with sending the Data Out 122, device 100 may configure and/or selectively use its own set of user-interface mechanisms 120. In one embodiment, the processor 110 outputs control 112 to disables (or possibly enable) some or all of the user-interface mechanisms 120 in response to performing operations as a result of the connection being made with the device 150. The disablement of the user-interface mechanisms 120 may be selective. Additionally, depending on the application or implementation, one or more embodiments provide that the processor 110 is capable of using one or more of its own user-interface mechanisms 120 while transmitting the Data Out 122. Processor 110 may communicate user-interface data 114 to one or more of the user-interface mechanisms 120 (such as display data for display 122, or audio data for audio output 124). Thus, the processor 110 may be providing data for use with user-interface mechanisms 120 and 170 at one time.

According to an embodiment, device 100 also receives data ("Data In 124") from the device 150. Data In 124 may result from operations performed by the processor 160 of the device 150, which may have capabilities to perform at least some functions independent of the device 100. In one embodiment, device 150 performs functions from which data ("Data Out 172") is generated and communicated to the device 100. This data may be received as the Data In 124.

In one embodiment, the devices 100 and 150 communicate to provide a combined functionality as a result of independent operations and processes performed by each device. Accordingly, one embodiment provides that the Data Out 122 communicated from the device 100 may result, in whole or in part, from processor 110 processing Data In 124. Likewise, the use of the user-interface mechanisms 120 by the processor 110 may be affected or configured by Data In 124, as communicated from device 150.

Figure 2A:
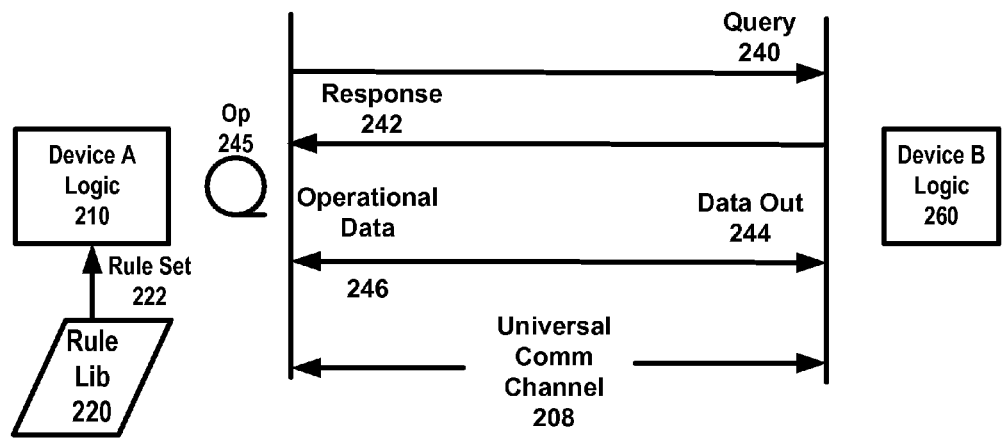
FIG. 2A is a data event diagram that illustrates a first computing device connecting and communicating with a second computing device, with distribution of resources and data amongst the two devices, according an embodiment of the invention.

FIG. 2A is a data event diagram that illustrates a first computing device connecting and communicating with a second computing device, with distribution of resources and data amongst the two devices, according an embodiment of the invention. In an embodiment of FIG. 2A, a first computing device 200 includes device logic 210. A rule library 220 is stored and used by the logic 210. A second computing device 250 includes logic 260. The logic 210 and 260 of each computing device may be assumed to enable each respective computing device 200, 250 to communicate across a universal communication channel 208 (created by interconnecting two universal communication ports on each device), as well as to distribute and use data. In an embodiment, the device 200 is assumed to be the host or controller of the communications amongst the two devices. However, other embodiments contemplate a shared role in the control of how data and resources are exchanged amongst the connected computing devices.

When the two devices are first connected, logic 210 on first computing device 200 sends a query 240 to the second computing device 250 for that device's capabilities or functions. The second computing device 250 may communicate a reply 242 with a declaration of its capabilities. Based on identification of capabilities provided in the reply 242, the logic 210 may access rule set 222 from the rule library 220.

As an alternative to querying the second device 250 for its capabilities, the second device may communicate a device or class identifier to the first device, either as part of reply 242, or in response to a connection between the two devices being formed. The first device 200 may use a profile store or database to determine the capabilities of the second device using the device or class identifier.

Once the capabilities of the second computing device 250 are known, logic 210 may then use the rule set 222 in order to determine (i) what data to communicate to the logic 260 for use on that device, and/or (ii) what resources of the second device 250 to use or resources of the first device 200 to share with the second device. In addition, logic 210 may configure resources of the first computing device 200 to enable the combined functionality amongst the connected computing devices. For example, the logic 210 may configure how data is to be communicated across the universal communication channel 208, including designation of pin elements. In an embodiment, device 200 performs a process or set of operations 245 when the connection with the second device 250 is made. The operations 245 may correspond to (i) system level operations, (ii) application level operations, or (iii) system and application level operations, performed either concurrently or in sequence. In one embodiment, the operations 245 are application level and relate to functionality or performance that the two devices perform as a combination. The logic 210 may cause the transmission of data that results from the operations 245 ("Data Out 244"). The Data Out 244 may cause use of processes and user-interface features on the device 250. Additionally, the Data Out 244 may yield output on the second computing device 250.

In other embodiments, operations 245 include system level operations that identify the second computing device and/or its capabilities, and then configure the first device based on the identification. In still another embodiment, multiple sets of operations 245 may be executed by the first computing device 200. For example, system level operations may detect and/or identify the capabilities of the connected device 250. Subsequently, an application associated with the particular capabilities and/or connected device may be launched. The execution of the application may result in, for example, Data Out 244.

Depending on implementation, one embodiment provides that the logic 260 may use the Data Out 244 to perform processes and to return or communicate operational data 246 to the logic 210 of the first device 200. The operational data 246 may in turn be used by the logic 210 to generate Data Out 244.

As an alternative, the operational data 246 may be generated and communicated completely independent of the first computing device 200. For example, the second computing device 250 may be equipped with its own programming or data sources from which operational data 246 may generate. In an embodiment of FIG. 3, for example, operational data 246 may correspond to GPS data received by the second device 250 independent of the first device, but communicated to the first device.

Figure 2B:
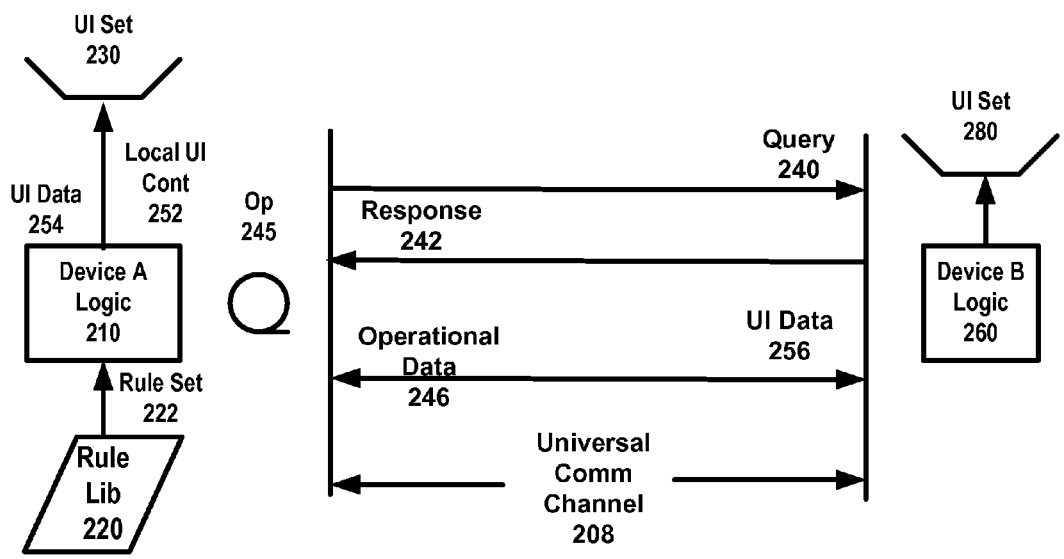
FIG. 2B is another data event diagram that illustrates a variation in which the first computing device connects and communicates with the second computing device, with the distribution of resources including combining user-interface functionality of the two devices, according an embodiment of the invention.

FIG. 2B is another data event diagram that illustrates a variation in which the first computing device connects and communicates with the second computing device, with the distribution of resources including combining user-interface functionality of the two devices, according an embodiment of the invention. As with an embodiment of FIG. 2A, first computing device 200 includes device logic 210 that uses rule library 220. The second computing device 250 includes logic 260. The devices use logic 210 and 260 to communicate with one another across the universal communication port channel 208. FIG. 2B also assumes that first computing device 200 has a set of user-interface mechanisms 230, and the second computing device 250 has its own set of user-interface mechanisms 280. The set of user-interface mechanisms 230 of the computing device 200 may differ in type, quantity or quality from the set of user-interface mechanisms 280 of the second computing device 250. For example, first computing device 200 may have a display, speakers and buttons, while second computing device 250 has no display and fewer buttons. The speaker on the second computing device 250 may be larger than that of the first computing device 200. Both devices may have display screens, but a display screen of the first computing device 200 may be contact-sensitive, while the display screen of the second device 200 is not contact-sensitive. Numerous other possibilities and scenarios are possible.

The first device 200 may discover the capabilities of the second device 250 through query 240 and response 242, or through communication of a device/class identifier by the second device with the response 242 or otherwise.

Once the capabilities of the second computing device 250 are known, logic 210 may then use the rule set 222 in order to determine (i) what data to communicate to the logic 260 for use on that device, and/or (ii) what resources of the second device 250 to use or resources of the first device 200 to share with the second device. In an embodiment shown by FIG. 2B, the reply 242 includes declaration of user-interface mechanisms. By receiving declarations of capabilities that include user-interface mechanisms, the logic 210 may (i) elect to utilize its own set of user-interface mechanisms 230 and not that of the second computing device, (ii) elect to utilize the set of user-interface mechanisms 280 of the second device 250 and not of the first device, or (iii) elect to utilize both set of user-interface mechanisms 230, 280 concurrently.

As an addition or alternative embodiment, logic 210 may be selective when determining which user-interface mechanism of each set 230, 280 to use. More specifically, in the case where both devices 200, 250 each have one or more user-interface mechanisms that are of a particular class, logic 210 may elect (i) to use its own user-interface mechanism and not that of the second computing device, (ii) to use the user-interface mechanism of the second device 250 and not of its own, or (iii) use both user-interface mechanisms concurrently.

In either of the embodiments described, the election made by logic 210 may be based in part or in whole by the rule set 222 that applies to the particular scenario. For a given scenario, the rule set 222 may include global rules, such as a rule that anytime the connecting device 250 contains a user-interface mechanism that is of a particular class, the first device 200 must always use that user-interface mechanisms (or the rule may state the converse). Some types of connecting devices 250 may be handled with global rules that apply to the entire set of user-interface mechanisms. For example, if the connecting device has capabilities that are known to be superior (or inferior), then global rules may dictate that logic 210 will always elect to use the set of user-interface mechanisms 280 of the second computing device 200 in stead of its own (or the converse, use its own set of user-interface mechanisms 230 when the connecting device 250 is known to be inferior).

In addition to global rules, one or more embodiments contemplate the use of rules that are specific to the connecting device 250, or to the scenario provided with the transaction. In one embodiment, the capabilities of the connected device 250 may be used to determine which individual user-interface mechanisms in the set 230 of device 200 should be de-activated. For example, if the connecting device is known to have capabilities of superior audio, or functionality for interfacing with superior audio (as in the case of car-kits), an embodiment provides that logic 210 deactivates its own audio output device and elects to use the audio output of the connecting device 200.

With reference to FIG. 2B, when the capabilities of the connecting device 250 are determined from the reply 242, logic 210 of the first computing device 200 communicates local user-interface control data 252 to one or more of its set of user-interface mechanisms 230. The local UI control data 252 may selectively deactivate some or all of the user-interface mechanisms in the set 230. If logic 210 elects to use a particular user-interface mechanism on the second computing device, user-interface data 256 may be communicated to the second computing device across the universal communication channel 208. The user-interface data 256 may correspond to, for example, audio data and/or video data. If logic 210 elects to use any of its own user-interface mechanisms 230 of the set, the logic 210 may signal local user-interface data 254 to the selected user-interface mechanism of the set 230. In some cases, either of the user-interface data 254, 256 may be intermittent, sporadic, and/or communication of state information, such as the case when the pertinent user-interface mechanism is a button. In other cases, either of the user-interface data 254, 256 may correspond to a stream of media data (audio and/or video).

As with an embodiment of FIG. 2A, device 200 may perform the operation set 245 when the connection with the second device 250 is made, and the operation set 245 may relate to functionality or performance that the two devices perform as a combination. The logic 210 may cause the transmission of data that results from the operations 245, which in an embodiment of FIG. 2A corresponds to Data Out 244. As an addition or alternative, an embodiment of FIG. 2B provides that the Data Out is replaced or supplemented with the user-interface data 256.

The logic 260 of the second computing device 200 may perform processes that return or otherwise communicate operational data 246 to the logic 210 of the first device 200. The operational data 246 may generated to be responsive to the user-interface data 256 (or Data Out 244), or it may be communicated independent of any data transmitted from the first computing device 200. Likewise, one or more implementations provide that on the first computing device 200, some or all of the user-interface data 256 (or Data Out 244) may be responsive to the receipt of the operational data 246.

Figure 2C:
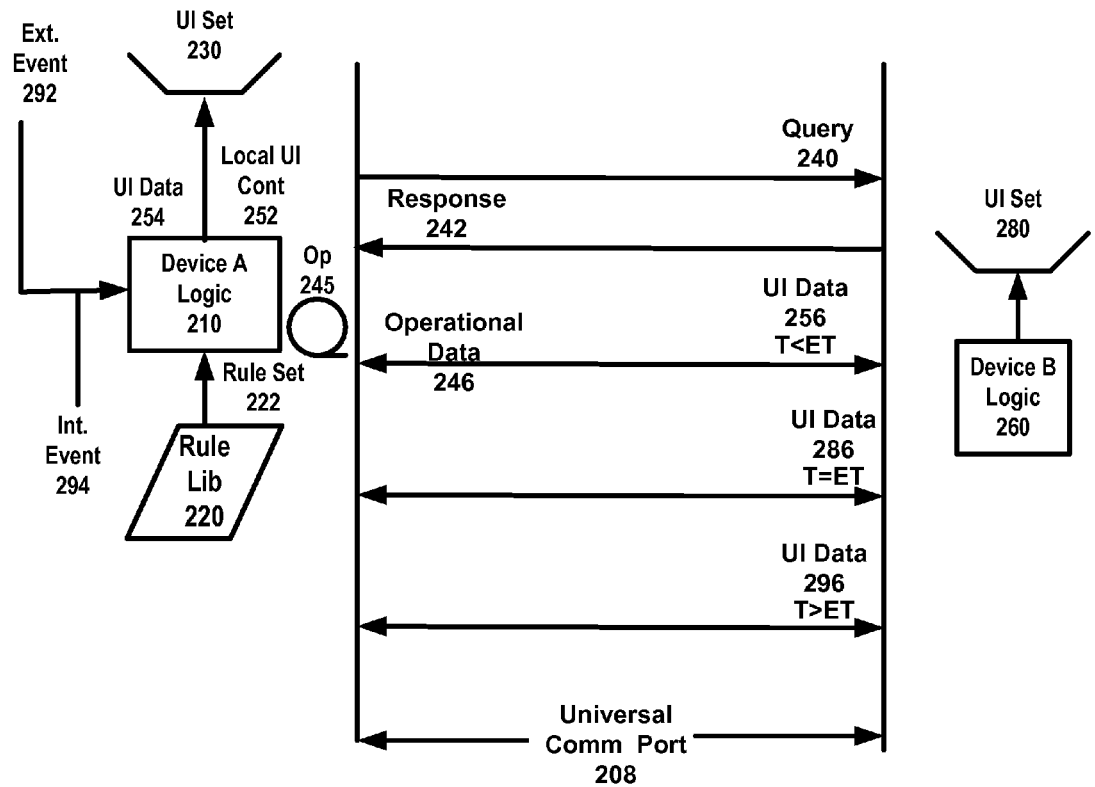
FIG. 2C is another data event diagram that illustrates a variation in which the first computing device connects and communicates with the second computing device, with the distribution of resources or user-interface features being dynamically responsive to the occurrence of events, according an embodiment of the invention.

FIG. 2C is another data event diagram that illustrates a variation in which the first computing device connects and communicates with the second computing device, with the distribution of resources or user-interface features being dynamically responsive to the occurrence of events, according an embodiment of the invention.

As with embodiments of FIG. 2A and FIG. 2B, first computing device 200 includes device logic 210 that uses rule library 220. The second computing device 250 includes logic 260. The devices use respective logic 210 and 260 to communicate with one another across the universal communication port channel 208. Embodiments of FIG. 2C may assume to incorporate functionality of user-interface selection, distribution and use, as described any of the embodiments of FIG. 2B. As such, first device 200 may discover the capabilities of the second device 250 through query 240 and response 242, or through communication of a device/class identifier by the second device with the response 242. Once the capabilities of the second computing device 250 are known, logic 210 may then use the rule set 222 in order to (i) route the user-interface data 256 to the second computing device 250, (ii) communicate local user-interface control data 252 to one or more of the local set of user-interface mechanisms 230, and/or (iii) route local user-interface data 254 to one or more of the user-interface mechanisms 230 in the set.

As an addition or alternative to embodiments described with FIG. 2B, embodiments of FIG. 2C provide that logic 210 includes capabilities to alter configurations for distribution of resources and user-interface mechanisms in response to the occurrence of events. Events may be external or internally generated. Internally generated events correspond to software driven events. Examples include alarm notifications, programmatic notifications such as incoming messages, and device alerts (low battery). External events may arise from the environment of the computing device or from a third computer or device that operates with the combination of the first and second computing device 200, 250. Examples of external events include the receipt of an incoming phone call when one of the devices is a mobile communication device. In the case where, for example, second computing device 250 is a car-kit, external events may correspond to those that arise from the vehicle, such as ignition on or off. External events may also include those that result from the user.

With the occurrence of either external events 292 or internal events 294, one or more embodiments provide that the logic 210 is configured to handle the events by altering or configuring the transmission of data communicated out to the computing device 250, and/or how incoming data from the second computing device 250 is used. Additionally, logic 210 may configure its own operations and use of resources (whether or not those operations affect the user-interface mechanisms) and/or instruct the second computing device 250 on its operations or use of resources. The alteration in the transmission and receipt of data may be determined by the rule set 222, and thus may depend on, for example, the capabilities or device type of the second computing device 250.

To illustrate how logic 210 may react to one of the internal or external events 292, 294, an embodiment of FIG. 2C assumes that first computing device 200 and second computing device 250 exchange operational data 246 and user-interface data 256 (or other Data Out 244) prior to the occurrence of one of the external or internal event 292, 294 (T(time)<ET (event time)).

During the occurrence of external/internal event 292, 294, or immediately thereafter (e.g. at T=ET), one or more embodiments provide that logic 210 may alter the data delivery from first computing device 200 to second computing device 250. In fact, whether data delivery is actually altered may depend on a variety of factors, including the nature of the particular event, and the class of the device 250 or its capabilities. But an embodiment of FIG. 2C assumes that logic 210 determines, from rule set 222, that an alteration to the data delivery is required to handle the event. In an embodiment in which data delivery is delivery of user-interface data 256, at the time of the event (T=ET), the data delivery is altered to event user-interface data 286. The alteration provided by event user-interface data 286 may be numerous, depending on factors such as the nature of the event and/or capabilities of the second device 250. Examples of alterations provided with event user-interface data 286 include (i) de-activating one or more of the user-interface mechanisms in use on the second device 200, at least temporarily, (ii) in the case where user-interface data 256 corresponds to audio data, the event user-interface data 286 may provide control to reduce volume levels, or control to cause the logic 260 to be re-routed. In another implementation, logic 210 may temporarily suspend or terminate data delivery to the second computing device altogether, as a result of the occurrence of the event. Still further, another embodiment provides that data delivery (e.g. Data Out 244) to the second computing device 250 includes instructions or configurations. In such an embodiment or implementation, the data delivery to the second computing device 250 may instruct that device to (i) de-activate or suspend, at least temporarily, (ii) adjust its performance or its use of user-interface mechanisms. For example, in the case where second device 250 corresponds to a car-kit, the external event 292 may correspond to ignition off. In such an embodiment, logic 210 may instruct the second computing device 250 to stop drawing power from the car's battery.

While embodiments described with FIG. 2C provide that the first computing device 200 responds to all events by sending or altering data delivery to the second computing device 250, one or more embodiments provide that logic 260 of second computing device may alter data communicated from the logic 260 to the first computing device 200 in response to detecting the occurrence of events, independent of communications from the first computing device 200. Still further, logic 260 of the second device 250 may assert over or send selective data out to the first computing device 200 when certain select events occur.

According to one or more embodiments, once the external or internal events 292, 294 are over, data exchange amongst the devices may resume either (i) in an unaltered form (i.e. at T<ET), (ii) in the altered form of when the event occurred (i.e. T=ET), (iii) in an altered form that is still different from when the event occurred (i.e. T>ET). An embodiment of FIG. 2C shows, for example, in instance when the logic 210 resumes sending user-interface data 256 to second computing device 200, and logic 260 of the second computing device provides operational data 246 to the first computing device 200.

However, either of the data deliveries may be altered with the occurrence of a particular event 292, 294. The reaction of one or both of logic 210, 260 may depend, at least in part, on the pertinent rules of the rule library 220.

Usage Scenarios

Figure 3:
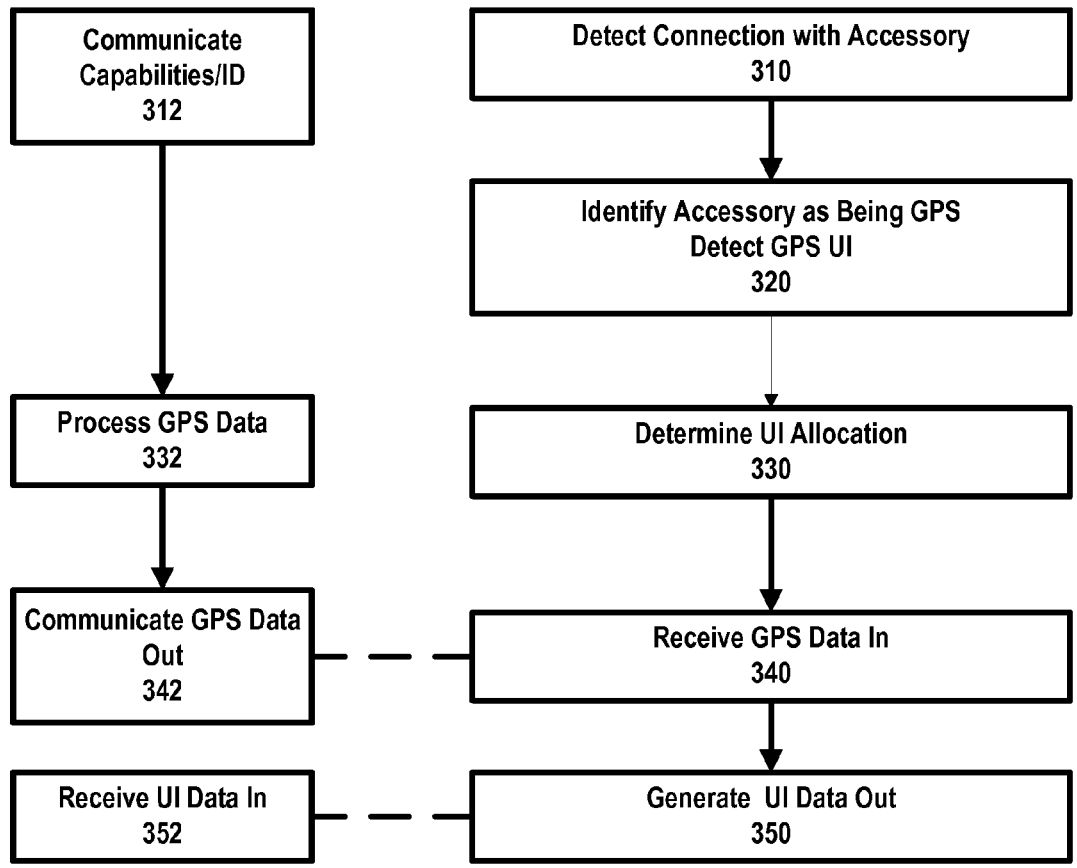
FIG. 3 illustrates a method performed between a mobile computing device and a car-kit, according to one or more embodiments of the invention.

FIG. 3 illustrates a method performed between a mobile computing device and a car-kit, according to one or more embodiments of the invention. A method such as described may be implemented using components or elements such as described with any of the embodiments described above. Accordingly, reference made to numerals of other figures is intended to illustrate a suitable element or component for performing a step or sub-step of a method being described.

A method of FIG. 3 assumes steps performed by a mobile computing device, and steps performed by the car-kit device. An embodiment such as shown assumes that the mobile computing device is the host, and thus corresponds to the first computing device 200 of embodiments described with FIG. 2A to FIG. 2C. A method such as described with FIG. 3 may performed once the mobile computing device and car-kit are connected across the universal communication channel. For example, the two devices may be connected across a physical and universal connector, or placed in communication with one another using a wireless link, such as provided by wireless USB or Bluetooth connection. Once the connection is made, the mobile computing device detects the presence of the car-kit in step 310. This step may be performed as either a system or application level task. In a step 312, the car-kit communicates its identifier (device or class), or alternatively communicates identifiers and other information about the car-kits capabilities. In the latter case, the car-kit may identify (i) what user-interface mechanisms the device has (speakers and power button), (ii) what attributes or characteristics those mechanisms include (e.g. power level of speakers), and (iii) other resources or capabilities that the device offers (e.g. device communicates GPS data). The mobile computing device receives and processes the identifications made from the car-kit in step 320. In one embodiment, processing may include performing application level operations, such as launching an application that uses the connected device. In such an embodiment, step 310 may be performed by logic corresponding to system level operations, or alternatively to another application. If the car-kit only provides a device or device class identifier (instead of the declaration of its capabilities), the processor on the mobile computing device may reference a profile database or store to determine the capabilities of the car-kit.

In step 330, the mobile computing device makes a determination of allocation of the user-interface mechanisms. In the case where the capabilities or device identification (e.g. step 310 and 320) cause or use an application, step 330 may also be performed as an application level operation. This may correspond to the mobile computing device using the logic 210 and the rule set 222 to determine which user-interface mechanisms of the car-kit should be used, and which user-interface mechanisms of the mobile device are to be de-activated. In, for example, the scenario presented by an embodiment of FIG. 3, the logic 210 of the mobile computing device may determine to use the audio output of the car-kit, to enable the power button or other button mechanism of the car-kit, and to de-activate the display of the mobile computing device if it is not in use (e.g. when car-kit is audio driven).

Once the allocation is determined and implemented, the two devices may operate. In one embodiment, the operation of the two devices combine to provide a combined functionality. In step 332, the car-kit receives and processes GPS data. This GPS data is communicated out to the mobile computing device in step 342.

On the mobile computing device, step 340 provides that the GPS data from the car-kit is received. In response, the mobile computing device generates user-interface data in step 350. In an embodiment in which the car-kit is audio driven, the user-interface data is audio data, formatted for consumption by the car-kit for its speakers.

On the car-kit, the audio data is received from the mobile computing device in step 352. The car-kit may output the audio through its speakers. As described with one or more embodiments of FIG. 2A to FIG. 2C, while the car-kit outputs the audio, it continues to receive the GPS data and communicates the GPS data as operational data 246 to the mobile computing device. In turn, the mobile computing device uses the operational data 246 to continue the delivery of audio out data.

In an embodiment of FIG. 3. the capabilities provided by the output mechanisms of the car-kit (or other computing device) do not necessarily have to be resident on the connected computing device. For example, in the case of the car-kit, the capabilities may correspond to the car-kit routing audio data to the car's radio system. Thus, the speakers of the car-kit may be those of the car.

With reference to an embodiment of FIG. 3, numerous types of events may be handled by the mobile computing device. For some events, such as software generated notifications (alarms and calendar notifications), logic on the mobile computing device may route audio output of that event to its own resident speaker, in order to avoid startling the driver who may be subjected to loud audio from the car-kit. Alternatively, the event may be handled by ignoring it locally, or altering the audio output to the car-kit while the event is ongoing. The alteration of the audio output may be in the form of reducing the volume of the chime or audible caused by the event, or altering the chime or audible to be a different kind of sound than the one that would be provided if made on the computing device (e.g. a hum may be played instead of a bell).

Another event in the scenario of the car-kit and the mobile computing device includes incoming phone calls. With incoming phone calls, the mobile computing device may activate its own microphone, rout the audio for the ringer to the speaker of the mobile computing device, and then re-route audio from the call to the car-kit where the voice on the line may be outputted on the louder speakers of the car-kit or even the car.

Another event in the scenario of the mobile computing device and car-kit includes ignition off events. In such cases, the mobile computing device may alter the use of power by one or both devices, and further use the resident user-interface mechanism on its own power rather than on the power of the car.

Numerous other usage scenarios exist. With further reference to FIG. 2A to FIG. 2C, one or more embodiments provide that the first computing device 210 corresponds to the mobile computing device, or alternatively to a media playback device, and the second computing device corresponds to a display device (such as a portable Liquid Crystal Monitor). According to an embodiment, the two devices may be connected using, for example, a Universal Serial Bus connection. From the connection, the mobile computing device may determine that the capabilities of the connected device are to provide display output, using a high quality monitor. For example, the monitor of the connected device may have greater resolution, brightness and/or size. In one embodiment, the mobile computing device may also determine that the connected device receives analog video output. Based on this determination of capabilities, the mobile computing device may (i) de-activate its own display, (ii) configure its communication port with the computing device to transmit analog data, (iii) determine to process data from a media source (e.g. a data file) and to communicate both video and/or audio out through the communication port. The logic 210 of the mobile computing device may recognize the video output mechanism of the connected device as being superior.

In an implementation in which the universal communication port 240 is provided by a USB type connection, analog video may be communicated using the identity pin element (ID) of the connection, while stereo audio is communicated using the two dedicated data transmission lines ("D+" and "D−"). U.S. patent application Ser. No. 11/428,294, filed May 30, 3006, and naming Karl Townsend as inventor, includes a description of driving analog video and audio in a manner described. The aforementioned patent application is hereby incorporated by reference in its entirety for all purposes.

Events handled by the mobile computing device the case of the connected video display may include notifications, which may generate a message. Display data related to the notifications may be routed to the display of the mobile computing device, rather than to the connected video display device. Likewise, with audible notifications, audio may be routed internally to the speakers rather than risk interruption with the media playback provided through the display device.

Another usage scenario includes the scenario where a mobile computing device connects to portable audio output device that has a small display unit. The display unit may be used to display information about or relating to audio being played back. When such a device is encountered, the mobile computing may configure itself to route audio relating to the media to the connected device, but not audio from notifications or events such as incoming calls. The mobile computing device may also know to transmit only small amounts of information for the display unit of the connected device.

With embodiments described above, the detection of the connected device, along with the determination of the connected device's capabilities, and the resulting configurations to resources and to user-interface mechanisms may all be performed automatically, and/or programmatically. Thus, for example, the mobile computing device may conform its operations and its use of the display device automatically after the display device is connected.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

The invention claimed is:

1. A computing device comprising:
   logic provided within a housing of the computing device;
   a plurality of user-interface mechanisms provided on or with the housing;
   a communication port configured to receive data from a connected device that, based on a primary functionality, is of any device class in a plurality of device classes;
   wherein the logic is configured to:
   enable an operative state for the plurality of user-interface mechanisms;

detect the connected device that connects to the communication port;
determine a set of functionality that the connected device is configured to perform when connected to the communication port;
perform operations that are for use with or by the connected device; and
route data to the connected device over the communication port and selectively disable one or more of the plurality of user-interface mechanisms while performing the operations based, at least in part, on the determination of the set of functionalities of the connected device.

2. The computing device of claim 1, wherein the communication port includes a universal serial bus (USB) connector.

3. The computing device of claim 1, wherein the logic is configured to determine the set of functionality of the connected device by querying the connected device for its functionality.

4. The computing device of claim 1, wherein the logic is configured to determine the set of functionality of the connected device by using an identifier of the connected device to determine the class or type of the device, and to identify the set of functionality from the class or type of the connected device.

5. The computing device of claim 1, wherein the computing device receives operational data from the connected device over the communication port, and wherein the operations that are performed for use with or by the connected device include processing the operational data, and wherein the logic is further configured to route data that results from processing the operational data to the connected device.

6. The computing device of claim 5, wherein the logic is further configured to disable one or more of the user-interface mechanisms on the computing device, and to route at least some user-interface data for use with a user-interface mechanism of the connected device, wherein the routed user-interface data results from processing the operational data.

7. The computing device of claim 6, wherein the set of user-interface mechanisms of the computing device that is disabled includes a display, and wherein the user-interface data routed by the logic includes display data for use with a display of the connected device.

8. The computing device of claim 6, wherein the set of user-interface mechanisms of the computing device that is disabled includes an audio output, and wherein the user-interface data routed by the logic includes audio data for use with an audio output of the connected device.

9. The computing device of claim 1, wherein set of user-interface mechanisms for the computing device include one or more mechanical actuation mechanisms, and wherein the logic is further configured to disable some or all of the user-interface mechanisms of the computing device while performing the operations that are for use with the connected device.

10. The computing device of claim 1, wherein the logic is further configured to perform a first response to a event when not performing the operations for use with the connected device, and wherein the logic is configured to perform a second response to the same event when performing the operations for use with the connected device.

11. The computing device of claim 1, wherein the logic routes to the connected computer user-interface data that results from performing the operations, wherein the user-interface data is for a particular set of one or more user-interface mechanisms on the connected device instead of a corresponding set of one or more user-interface mechanisms on the computing device, and wherein the logic is further configured to respond to a first event when performing the operations by using one or more of the user-interface mechanisms in the corresponding set of one or more user-interface mechanisms.

12. The computing device of claim 11, wherein the computing device uses the one or more user-interface mechanisms of the corresponding set by interrupting routing at least some of the user-interface data to the connected device in order to respond to the first event.

13. The computing device of claim 11, wherein the set of user-interface mechanisms on the connected device and the corresponding set of user-interface mechanisms on the computing device are audio output mechanisms, and wherein the event corresponds to a notification, and wherein the computing device responds to the notification by performing an audible using the audio output mechanisms of the computing device.

14. The computing device of claim 5, wherein the operational data received by the computing device from the connected device is global positioning system data, and wherein the operations that are performed for use with or by the connected device include generating user-interface data from the global positioning system data.

15. The computing device of claim 14, wherein the user-interface data includes one of (i) audio output data, (ii) video output data, or (iii) a combination of audio and video output, and wherein the computing device routes the generated user-interface data to the connected device in order to enable the connected device to generate an output using one or more of the user-interface mechanisms that are available to the connected device.

16. The computing device of claim 1, wherein the computing device is configured to detect a video output device and to determine functionality that is capable of being performed by the video output device, and wherein logic is configured to perform operations that include generating video output data, and wherein the logic is further configured to (i) disable a display of the computing device, and (ii) route the video output data to the connected device over the communication port.

17. The computing device of claim 1, wherein the computing device is configured to detect an analog video output device and to determine functionality that is capable of being performed by the analog video output device, and wherein logic is configured to perform operations that include generating analog video output data, and wherein the logic is further configured to (i) disable a display of the computing device, and (ii) route the analog video output data to the connected device over the communication port.

18. The computing device of claim 1, wherein the computing device receives operational data from a third device that is connected to the computing device over the communication port, and wherein the operations that are performed for use with or by the connected device include processing the operational data, and wherein the logic is further configured to route data that results from processing the operational data to the connected device.

19. The computing device of claim 18, wherein the third device is a user-interface device, and wherein operational data is input data generated from a user operating the user-interface device.

20. A computing system comprising:
a first computing device including a first set of user-interface mechanisms;

a second computing device including a second set of user-interface mechanisms;
a connection channel that connects the first computing device to the second computing device, and wherein the connection channel enables each device to connect to a device of any one of a plurality of device classes or types;
logic provided with one or both of the first computing device and the second computing device, wherein the logic is configured to:
  perform operations that are for use by the first computing device and the second computing device when the first and second computing devices are connected using the universal connection channel;
  automatically make a first selection of user-interface mechanisms from at least one of the first set or from the second set when performing the operations;
  responsive to one or more designated events, make a second selection of user-interface mechanisms from the first set or from the second set when performing a response to the one or more designated events;
  wherein the second selection is different from the first selection; and
  wherein the user-interface mechanisms of at least one of the first selection or second selection includes the user-interface mechanisms from the first set and from the second set.

21. A computing device comprising:
logic provided within a housing of the computing device;
a plurality of user-interface mechanisms provided on or with the housing, wherein the plurality of user-interface mechanisms includes at least one of a display, an audio output, or one or more mechanical actuation mechanisms;
a communication port configured to receive data from a connected device that, based on a primary functionality, is of any device class in a plurality of device classes, wherein the connected device includes a second plurality of user-interface mechanisms; and
wherein the logic is configured to:
  enable an operative state for the plurality of user-interface mechanisms of the computing device;
  detect the connected device that connects to the communication port;
  determine a set of functionality that the connected device is configured to perform when connected to the communication port;
  perform operations that are for use with or by the connected device; and
  route data to the connected device over the communication port and (i) selectively disable one or more of the plurality of user-interface mechanisms of the computing device while performing the operations based, at least in part, on the determination of the set of functionalities of the connected device, and (ii) selectively enable one or more of the second plurality of user-interface mechanisms of the connected device.

22. The computing device of claim 21, wherein the communication port includes a universal serial bus (USB) connector.

23. The computing device of claim 21, wherein the logic is configured to determine the set of functionality of the connected device by querying the connected device for its functionality.

24. The computing device of claim 21, wherein the logic is configured to determine the set of functionality of the connected device by using an identifier of the connected device to determine the class or type of the device, and to identify the set of functionality from the class or type of the connected device.

25. The computing device of claim 21, wherein the computing device receives operational data from a third device that is connected to the computing device over the communication port, and wherein the operations that are performed for use with or by the connected device include processing the operational data, and wherein the logic is further configured to route data that results from processing the operational data to the connected device.

* * * * *